Nov. 24, 1953  E. L. CALLAHAN  2,659,976
SLOPE LEVEL
Filed Feb. 28, 1947  6 Sheets-Sheet 1
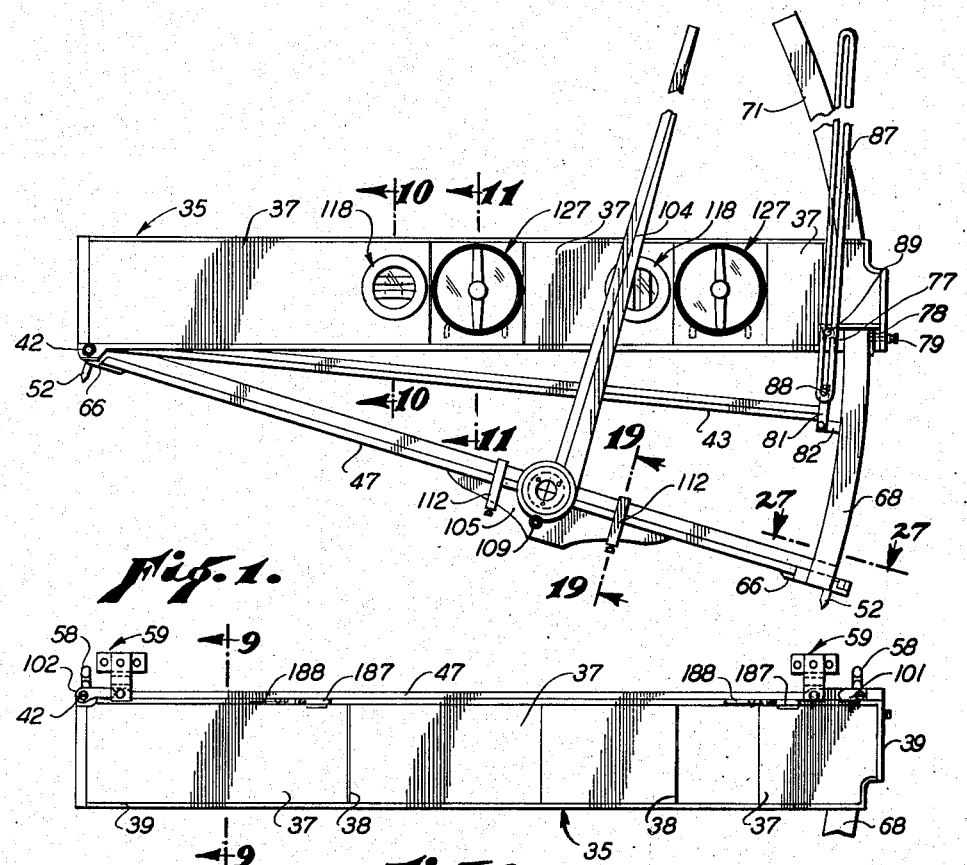
Fig. 1.
Fig. 2.
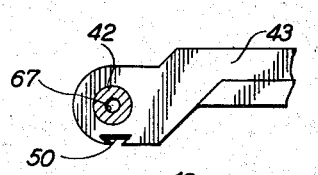
Fig. 3.
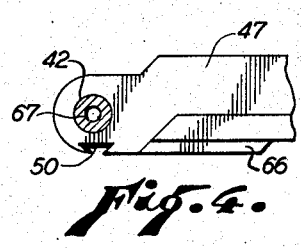
Fig. 4.
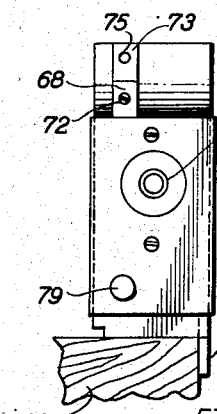
Fig. 5.
INVENTOR.
EZRA LEO CALLAHAN
BY
Westall & Westall
ATTORNEYS

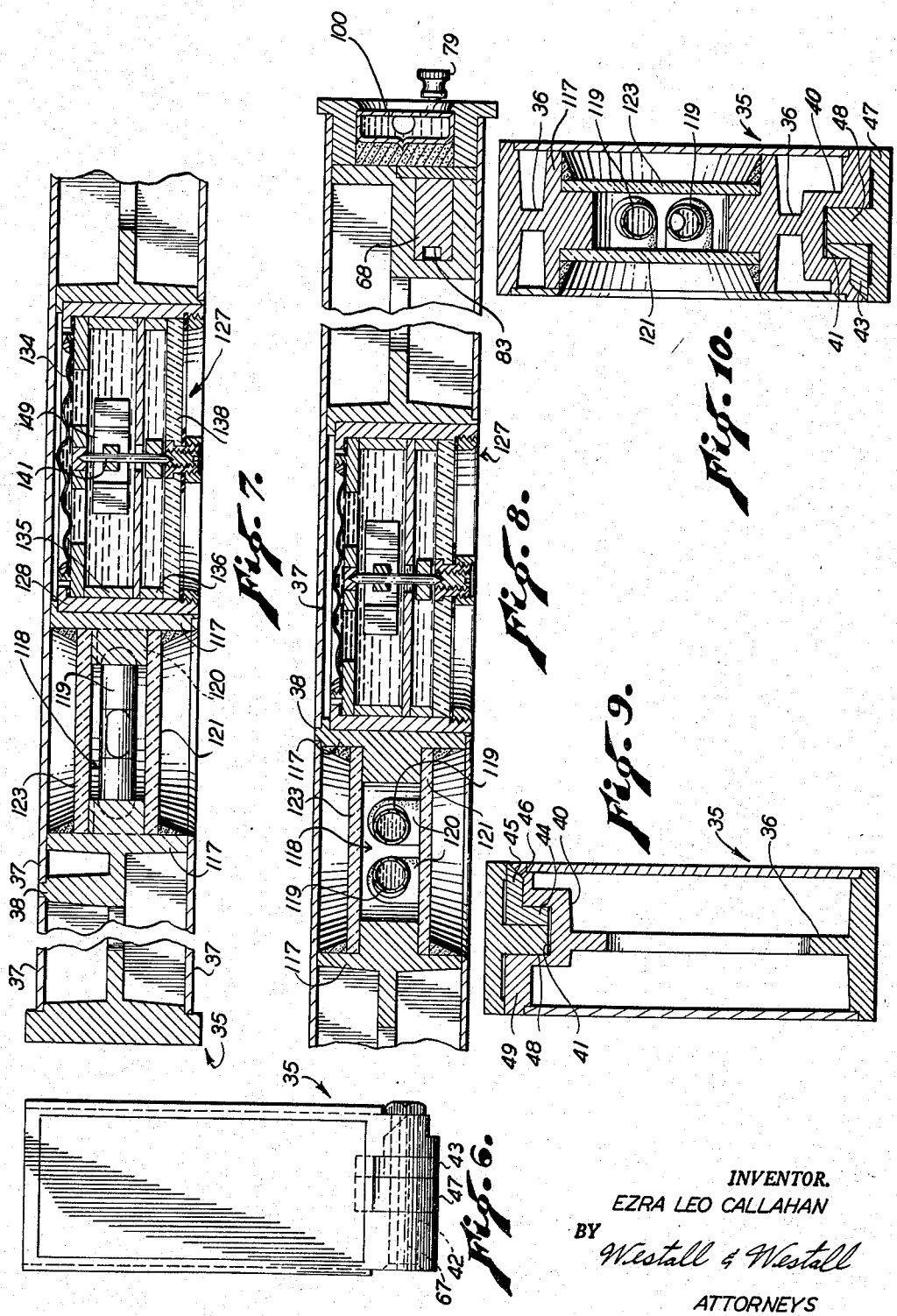

Nov. 24, 1953
E. L. CALLAHAN
2,659,976
SLOPE LEVEL
Filed Feb. 28, 1947
6 Sheets-Sheet 3
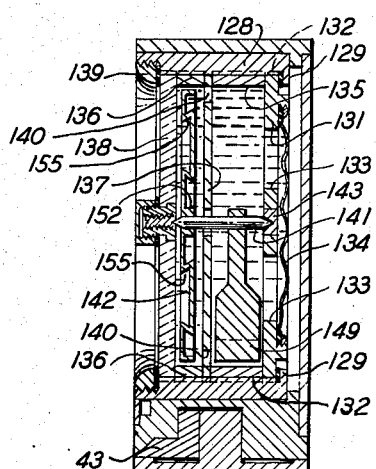
Fig. 11.
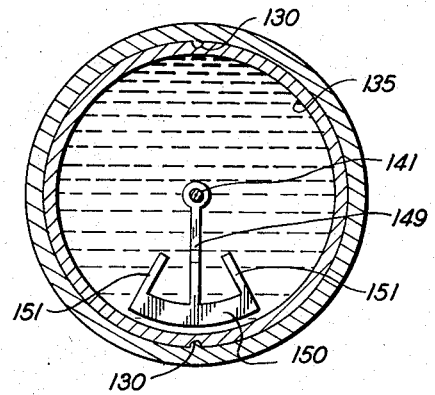
Fig. 13.
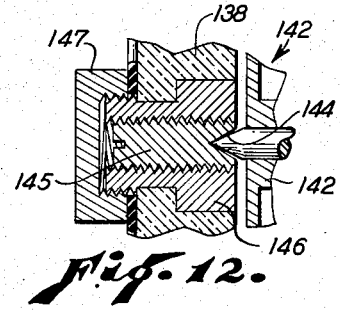
Fig. 12.
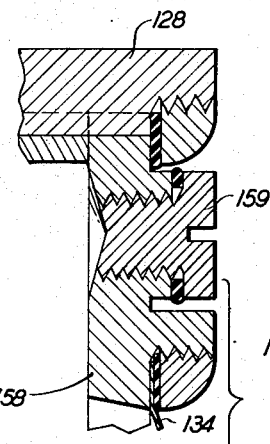
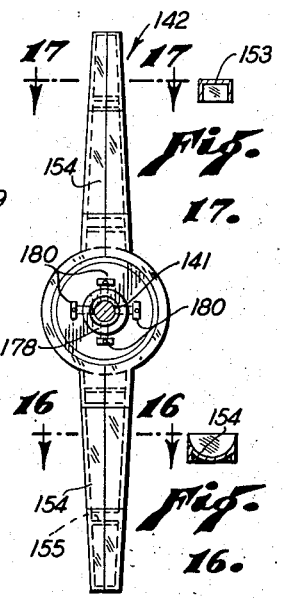
Fig. 17.
Fig. 16.
Fig. 15.
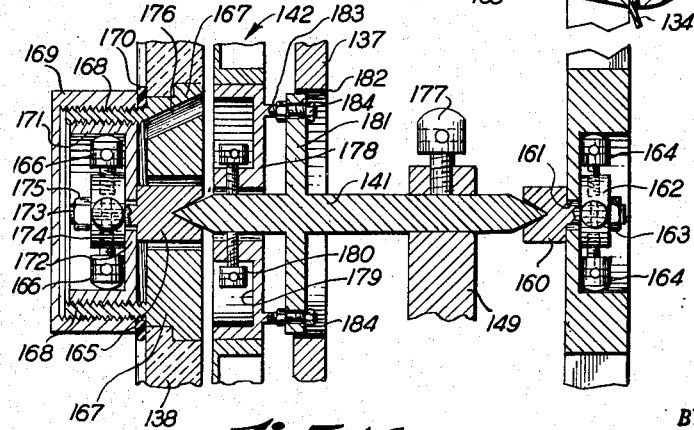
Fig. 14.
INVENTOR.
EZRA LEO CALLAHAN
BY Westall & Westall
ATTORNEYS.

Nov. 24, 1953 — E. L. CALLAHAN — 2,659,976
SLOPE LEVEL
Filed Feb. 28, 1947 — 6 Sheets-Sheet 4
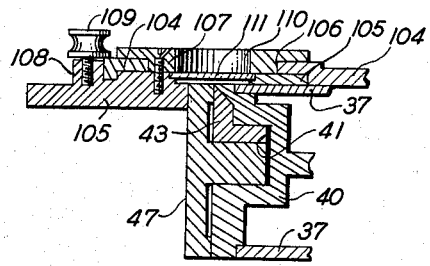
Fig. 18.
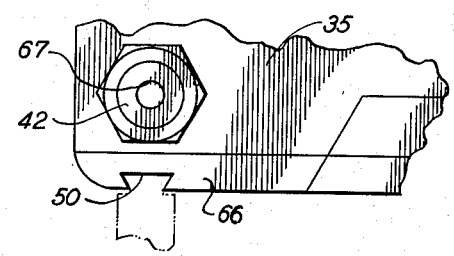
Fig. 20.
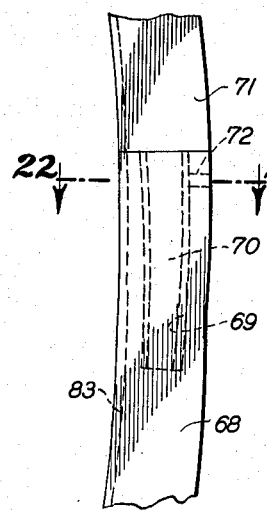
Fig. 21.
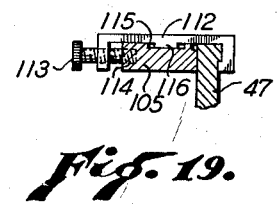
Fig. 19.
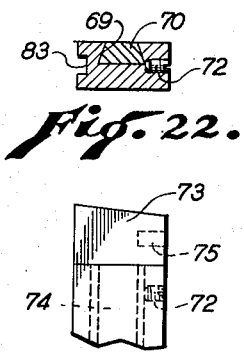
Fig. 22.
Fig. 23.
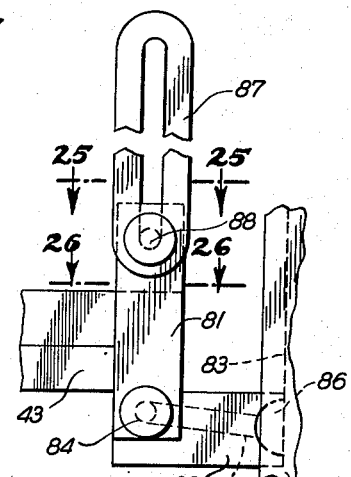
Fig. 24.
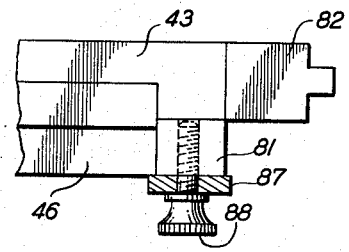
Fig. 25.
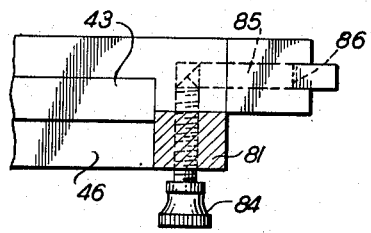
Fig. 26.
INVENTOR.
EZRA LEO CALLAHAN
BY Westall & Westall
ATTORNEYS

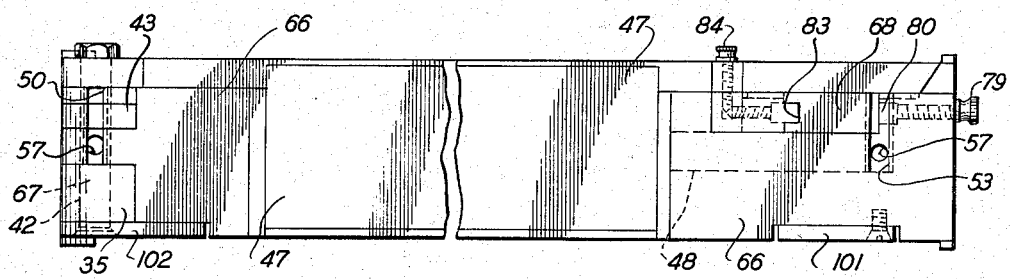
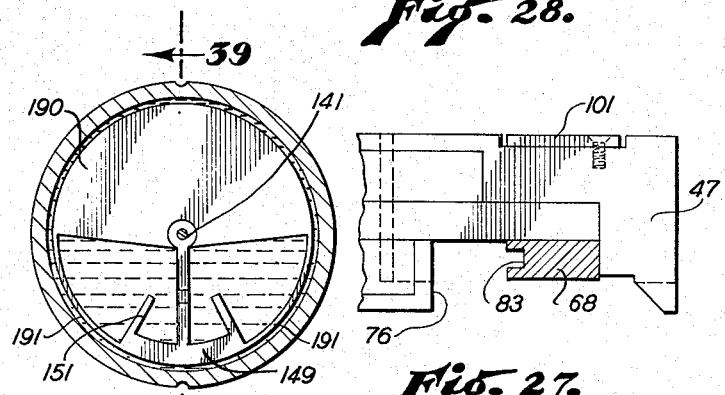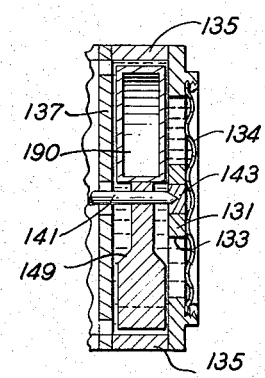
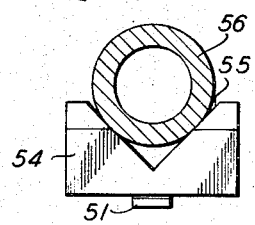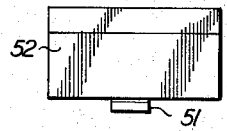
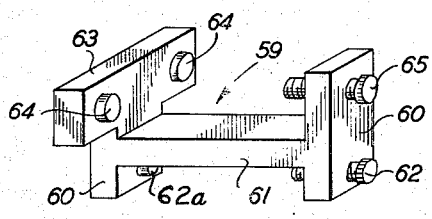

Nov. 24, 1953   E. L. CALLAHAN   2,659,976
SLOPE LEVEL
Filed Feb. 28, 1947   6 Sheets-Sheet 6
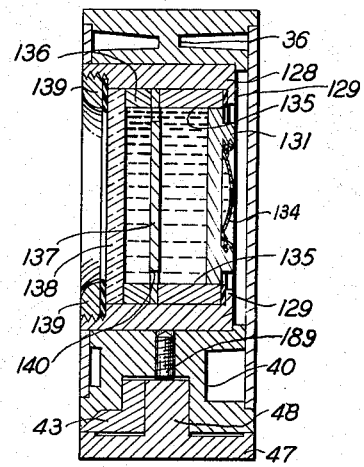
Fig. 34.
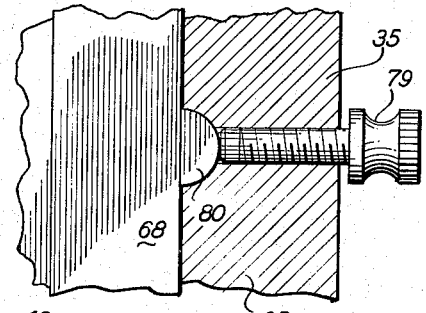
Fig. 35.
Fig. 36.
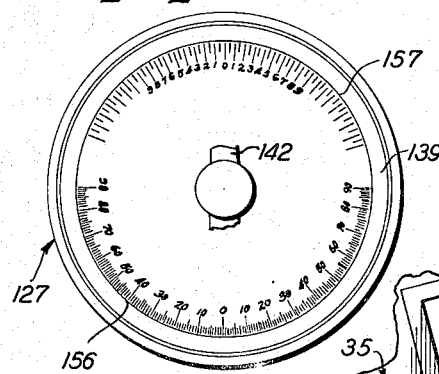
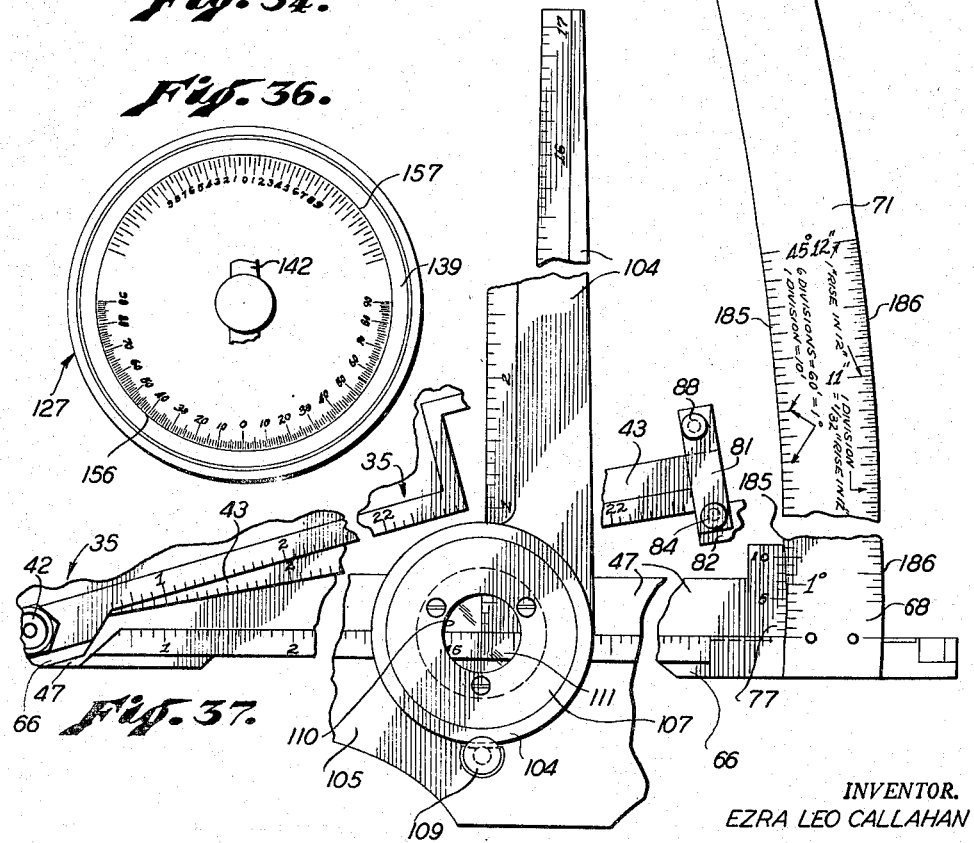
Fig. 37.
INVENTOR.
EZRA LEO CALLAHAN
BY
*Westall & Westall*
ATTORNEYS Patented Nov. 24, 1953

2,659,976

UNITED STATES PATENT OFFICE 2,659,976

SLOPE LEVEL

Ezra Leo Callahan, Inglewood, Calif.

Application February 28, 1947, Serial No. 731,672

4 Claims. (Cl. 33—98)

This invention relates to slope levels adapted particularly for use by carpenters, engineers, general contractors, construction foremen, mechanics, architects, and others whose work requires them to predetermine dimensions, angles and the proper disposition of various structural elements, and having particular application as an instrument to facilitate the predetermination of the cutting plane of roof rafters, sheathing and the like.

A principal object of the invention is to provide a level assembly embodying in combination various graduated elements bearing scales in novel arrangement for the guidance of the user in manipulating the elements of the level for ascertaining and delineating the angles of slopes and bevels, testing and establishing levels, determining distances, and in laying out areas.

More specifically, an object hereof is the provision of a stock having a straight edge graduated in terms of inches for measuring one side of an angle formed between the straight edge and either of a pair of arms pivoted to the stock, the degree of any angle assumed being indicated upon an arc, associated with the opposite ends of the arms, together with a corresponding rise in twelve inches adapted to be read in conjunction with the scale of degrees, whereby the degree of the angle formed between the slope and run of structural elements of the work is converted to rise in twelve inches and vice versa, for direct reading.

Another object is the provision of a T-square movable longitudinally on one of the pivoted arms and operable in conjunction therewith and with the stock for laying out triangles of any required form, the dimensions thereof being determinable from graduations carried by the arm, stock and square, respectively.

It is also an important object of the present invention to provide within a single stock a plurality of spirit levels in combination with rotary slope indicators of novel construction by which the angle of a plane surface of the work against which either of the sides or ends of the stock is placed, may be ascertained and selectively read as the corresponding rise in twelve inches to assist the user in determining and laying out upon the structural elements of the level other angles and proportionate dimensions.

Another object is to provide means associated with the mechanism above alluded to for mounting, suspending or otherwise attaching the stock in proper relationship with the work to facilitate the most effective manipulation of the associated arms for determining the angle sought.

Still another object is to provide a pair of arms independently pivoted to a straight edge, having associated therewith a calibrated arc to indicate the angle formed between each of the arms and the straight edge, whereby an angle of predetermined degree may be formed between the straight edge and one of said arms and thereafter the angle thus formed may be variously and critically proportioned by the other arm to indicate the angle of different slopes simultaneously.

Numerous other objects and salient features of my invention, as, for example, relative simplicity and construction, ease of operation, economy of manufacture, and arrangement of parts most conducive to complete, efficient utility, and durability, will be apparent to those of skill in the art upon an examination of the following description read in the light of the accompanying drawings, in which:

Fig. 1 is a side elevation of a slope level embodying my invention;

Fig. 2 is a fragmentary elevational view of the level shown in Fig. 1, taken from the reverse side thereof and depicting modified means for locating the device with respect to the work;

Fig. 3 is an enlarged broken elevation of the pivoted end of the intermediate arm;

Fig. 4 is a similar enlarged broken elevation of the pivoted end of the outer arm;

Fig. 5 is an end elevation of the stock showing particularly the utility of the spirit level therein and the cap for the end of primary arc section;

Fig. 6 is an elevation of the end of the stock in which the arms are pivoted with the arms in folded relation, and showing in dotted lines an axial opening through the pivot pin for the arms through which an anchor pin may be projected;

Fig. 7 is a broken longitudinal sectional view through one end of the stock;

Fig. 8 is a broken section of the opposite end of the level, and comprises a continuation of the view of Fig. 7;

Fig. 9 is a transverse sectional view taken on line 9—9 of Fig. 2;

Figs. 10 and 11 are transverse sections on correspondingly-numbered lines of Fig. 1;

Fig. 12 is an enlarged broken section through the supporting and adjusting mechanism for the shaft of one of the rotary slope indicators;

Fig. 13 is a transverse sectional view through one of the rotary slope indicators shown in Fig. 11, and depicting particularly the construction of the pendulum weight and fins associated therewith by which the indicator is actuated;

Fig. 14 is a sectional view through a modified form of rotary slope indicator;

Fig. 15 is an enlarged front elevation of the dual indicator hand carried by each of the rotary indicators;

Figs. 16 and 17 are sectional views through the offset portions and outer ends, respectively, of the hand shown in Fig. 15;

Fig. 18 is a sectional view through the pivotal connection between the elements of the T-square, and depicts the association of the latter with the outer arm;

Fig. 19 is a sectional view through the clamp by which the T-square is secured in adjusted position against movement longitudinally of the lower bar;

Fig. 20 is a fragmentary elevation of the end of the stock in which the arms are pivoted, showing schematically a chisel guide in the dovetail groove provided therefor;

Fig. 21 is a fragmentary elevation of the arc, showing in dotted lines the projection of the extension into the primary arc section;

Fig. 22 is a sectional view on lines 22—22 of Fig. 21;

Fig. 23 is an elevation of the cap by which the end of the primary section of the arc is protected when the extension of the latter is removed;

Fig. 24 is a fragmentary enlarged elevation of the slidable connection and locking means between the intermediate arm and arc;

Fig. 25 is a fragmentary sectional view on line 25—25 of Fig. 24 of the end of the intermediate arm which is adapted for slidable association with the arc and showing particularly the screw by which the arm is connected rigidly to the stock;

Fig. 26 is a transverse view taken on lines 26—26 of Fig. 24, showing the screw by which the friction lock for securing the intermediate arm and arc in pre-adjusted relative positions is actuated;

Fig. 27 is a section through the arc, taken on lines 27—27 of Fig. 1, showing in plan the end of the outer arm to which the arc is secured;

Fig. 28 is a plan view of the underside of the stock with the arms shown in folded relationship and the T-square removed;

Fig. 29 is an elevation of one of the chisel guides adapted to be removably mounted in each end of the outer arm;

Fig. 30 is an elevation of one of the chisel guides shown in Fig. 29, but taken at right angles to the view of the latter figure;

Fig. 31 is an elevation of a modified form of chisel guide having a V-slot therein, illustrating its utility with a pipe section shown in cross-section;

Fig. 32 is an elevation of one of the hooks adapted to be substituted for the chisel guides shown in Figs. 29 and 30, for suspending the assembly from the work;

Fig. 33 is a perspective view of one of the clamps shown in Fig. 2;

Fig. 34 is a sectional view through one of the rotary indicators, showing particularly one of the adjusting screws by which the casing is held against rotative displacement;

Fig. 35 is a fragmentary sectional view through one end of the stock depicting the arc in elevation and the gib by which it is frictionally locked;

Fig. 36 is a front elevation of one of the rotary indicators illustrating the scales of degrees and of slope per foot delineated on the inner surface of the crystal of the indicator;

Fig. 37 is a broken fragmentary elevation of the level, showing particularly the calibrations on the stock and arms and scales carried by the arc;

Fig. 38 is a sectional view through a modified form of rotary indicator incorporating a float;

Fig. 39 is a broken transverse sectional view taken on line 39—39 of Fig. 38.

Referring more particularly to the drawings, the numerals of which indicate similar parts throughout the several views, 35 (Fig. 1) designates the stock of the level which consists preferably of a generally-rectangular casting having internal ribs 36 (see Fig. 9) to reinforce the sides thereof. The opposite sides of the stock are enclosed by a plurality of plates 37, adapted to bear indicia (not shown) such as tables of figures, instructions, illustrations, etc., which are useful in properly manipulating the apparatus. The respective plates 37 extend between transverse brace members 38 integral with the stock (see Fig. 2). A rim 39 of the casting extending around the edge of each side of the stock protects the edges of the plates 37.

The lower longitudinal bar 40 (Figs. 9 and 10) of stock 35 is formed with an elongated recess 41 which extends from one end to adjacent the opposite end thereof for the reception of a pair of arms which are pivoted at one end of the stock on a pin 42 (see Figs. 1 and 6). The intermediate arm 43 (Fig. 10) is L-shaped in cross-section, one side 44 (Fig. 9) being received, when parallel to the stock, in the elongated recess 41. The laterally-projecting side 45 of the intermediate arm 43 overlies and is contiguous with the outer surface of bar 40 at one side of recess 41. The lateral edge of the overlying side 45 of the intermediate arm 43 and the adjacent edge of bar 40 are complementarily bevelled as at 46, so as to fit snugly together when arm 43 is in folded, inoperative relationship with the stock.

The outer or lower arm 47 (Figs. 1 and 10) is T-shaped in cross-section, the rib 48 thereof being aligned with and adapted for reception into the recess 41 of bar 40 contiguous with side 44 of the intermediate arm 43 when in folded position. The laterally-projecting portions of the outer arm 47 are of a combined width equal to that of bar 40 and overhang the intermediate arm 43 on one side and a built-up portion 49 (Fig. 9) of bar 40 at the opposite side of recess 41. The pivoted ends of arms 43 and 47 are jointly received within the body of stock 35 at the end of recess 41 (Fig. 6) and are journalled as above indicated upon a pin 42 extending through the portion 49 (Fig. 9). Thus each arm is pivoted independently of the other to permit its movement out of recess 41 and to assume various angular relations with the stock, the outer arm 47 being first displaced from the stock to permit release of the intermediate arm.

The underside of the stock directly below pin 42 is formed with a transverse, dovetailed, tapered groove 50 (Figs. 20 and 28) which also extends through the pivoted end of the intermediate arm 43 and into the outer arm 47 for the reception of a complementarily-formed projection 51 of a chisel guide 52 (Figs. 29 and 30). When the arms are in parallel relation with the stock, the reaches of groove 50 in the stock and arms are aligned with one another, whereby the dovetailed projection 51 of the guide 52 may be slipped laterally through the groove in the stock and intermediate arm and thence into the outer arm. The size and taper of groove 50 is such as to frictionally lock the guide in the outer arm at a point intermediate the sides of the stock assembly. In the opposite end of outer arm 47 another transverse, tapered groove 53 is formed, located, as hereinafter more precisely defined, for the reception of the projection 51 of a second complementary guide 52 of identical construction, each guide 52 is tapered to a sharp edge to assist in mounting the outer arm 47 upon irregular, rough or sloping surfaces. The modified form of chisel guide 54 shown in Fig. 31 adapted for alternative utility is formed with a V-shaped slot 55 in the tapered end thereof to facilitate centering and in maintaining the position of the arm 47 to which the guides are attached upon a pipe 56, tubing, or other work having an arcuate surface, as indicated in Fig. 31. Accordingly, the guides 52 or 54 may support the arm in parallel but spaced relation to a straight line extending between the two points on the work contacted by the guides and thereby bridge irregularities in the work. It will be appreciated that with the outer arm 47 in folded relationship, the guides will project at right angles from the stock, which itself will be supported in parallel relationship with the plane of the work to aid the user in determining from the levels carried by the stock and hereinafter described, the angle of inclination of the work.

A pair of tapped holes 57 are drilled in the bottom of each groove 50 and 53 in arm 47, to receive in threaded engagement a pair of hooks 58 (Figs. 2 and 32) by which the level may be suspended in inverted position (with respect to that shown in Fig. 1) from the work to determine the angle of inclination of a line extending between said points, as will be obvious.

In accordance with certain utilities, it is desirable that a pair of clamps 59 (Figs. 2 and 33) be provided for attachment to opposite ends of the outer arm so as to secure the latter firmly to a board or beam relative to which the degrees of angles are to be determined. Each clamp 59 comprises a pair of opposed members 60 connected in parallel relationship by an integral, centrally disposed bar 61 of sufficient length whereby the clamp may straddle the outer arm 47. A set screw 62, threaded through the end of one of members 60, is adapted to bear against one end of arm 47 so as to hold the corresponding end of the opposite upright 60 in frictional engagement with edge of the arm. A lug 62a projecting inwardly from the other upright member 60 in axial alignment with screw 62 is adapted to engage the opposite edge of arm 47. A transverse brace member 63 is secured to the outer end of one of the members 60 and is equipped with a pair of spaced, inwardly-directed work-engaging lugs 64. The outer end of the other member 60 carries a set screw 65 whereby a bar, board or beam may be clamped between the lugs 64 and set screw 65 of the respective members 60 so as to hold the work in parallel relation against the outer arm.

In order to support the outer arm in parallel relationship with the work, and to effectively bridge slight irregularities in the surface of the work, without installation of the guides 52, hooks 58 or clamps 59, the ends of the outer arm are formed with pedestals 66 (Figs. 1 and 28) to support arm 47 upon and above the selected surface of the work.

The pin 42 by which the arms 43 and 47 are pivoted to stock 35 is formed with an axial opening 67 (Figs. 6 and 20) extending throughout its length for the projection of a nail or similar device (not shown) therethrough so as to provide a trivet point for holding the pivoted ends of the stock and arms in fixed position upon the work and facilitate the laying out of horizontal angles having vertices on the trivet point, incident to the manipulation of the arms with respect to the stock.

To the free end of outer arm 47, one end of a sectional arc member 68 is secured by suitable means so as to slide through the corresponding end of stock 35 in the plane of arms 43 and 47 incident to the movement of the outer arm on its pivot.

The arc base section 68, having one end secured to arm 47, is formed with a tapered, dovetailed mortise 69 (Fig. 22) in its opposite end for the reception of an arcuate tenon 70 integral with an arc extension 71 so as to maintain the extension of the arc in proper alignment with the base section 68. A set screw 72, threaded through the edge of the base section 68 into contact with the tenon 70, prevents inadvertent withdrawal or displacement of extension 71 while permitting removal of the same to minimize the bulk of the instrument when the extension is not needed. Normally, with the extension 71 removed, the end of the base section 68 of the arc is protected by a cap 73 equipped with an integral tenon 74 adapted for reception into the mortise groove 69 to maintain the outer enlarged end of cap 73 in squared position with the end of the arc section 68. It will be understood that the arc section 68 and cap 73 are of a combined length to position the end of the cap flush with the stock when arm 47 is folded. The cap 73 is held in place by set screw 72 as hereinabove described in connection with the association of the base section and its extension. A lateral hole 75 in the cap is provided for the reception of a pin or the like (not shown) to facilitate removal of the tenon 74 of cap 73 from the mortise 69 of the arc section 68.

The dovetailed projection of the chisel guide 52 hereinabove described, mounted in the outer end of arm 47, is received within the tapered dovetailed groove 53 extending transversely across the lower end of the arc section 68 and outer arm 47 so as to bind the projection 51 of the guide 52 in the middle of the arm and with its tapered edge in transverse alignment with the outer edge of the arc (see Fig. 28).

The lower corner of stock 35 adjacent the opening through which the arc extends is cut away as indicated at 76 (Figs. 1 and 27), whereby the portion of the arc 68 adjacent its point of attachment to the outer arm is visible through the opening in the stock when the arm is in folded position. The face of the composite arc 68—71 bears a scale, later described, along each edge thereof adapted to be read in conjunction with a vernier 77 and an index plate 78, respectively, secured in the opening 76 (Fig. 27) directly across from vernier 77 adjacent the opposite outer edge of the arc.

In order to secure the arc 68 and the outer arm 47 in any adjusted position, I provide a friction lock disposed in a tapped hole extending through the end of stock 35 in alignment with arc 68 and intersecting the opening in the stock through which the arc projects. A thumb screw 79, threaded into the hole, is manually actuated to bear against a gib 80 so as to force the latter into frictional engagement with the edge of the arc.

The free end of the intermediate arm 43 terminates adjacent the inner edge of arc 68 and is formed with an integral finger 81 (Figs. 1 and 24) offset and transverse to the axis of arm 43 so as to project above and below the latter. Integral with the lower end of finger 81 is a guide member 82 which extends parallel to arm 43 into slidable engagement with aligned groove 83, rectangular in cross-section, formed in the inner edges of the arc sections 68 and 71.

A thumb screw 84 is threaded into a tapped hole in the lower end of finger 81, which hole intersects with the inner end of a hole extending at right angles to the former through the guide member 82. The inner end of screw 84 is conical in form to cooperate with a similarly formed end of a pin 85 snugly accommodated within the hole in member 82. A gib 86, loosely fitted into the portion of the hole opening through outer end of member 82, is adapted to bear against the bottom of the grooves 83 in the arc 68 and its extension 71. By threading the thumb screw 84 into the hole, the pin 85 is displaced outwardly to correspondingly force gib 86 against the arc and thereby frictionally lock the intermediate arm 43 and arc 68 against relative movement.

In order to directly secure the intermediate arm in any angular relationship with the stock or in a position folded against the stock, I provide an elongated slotted retainer 87 (Fig. 24) overlying stock 35 and having one end pivoted to the upper end of finger 81, comprising a part of the intermediate arm 43, by a screw 88. A thumb screw 89, extending through the slot and threaded into the stock above the vernier 77, slidably engages the retainer 87. It will be obvious that by tightening the screw 89 down upon the retainer the arm 43 may be secured firmly against movement relative to the stock regardless of its angular disposition. The retainer 87 is of a length to extend between finger 81 of arm 43 and the thumb screw 89 when the arm is in fully extended position with respect to the stock so as not to limit the range of movement or utility of the intermediate arm. The hole in the stock into which the screw 89 is threaded is so placed that with the retainer 87 and screws 88 and 89 removed, the tapped hole in finger 81 into which screw 88 extends will, upon folding the intermediate arm into the recess 41 of the stock, be aligned with the hole in the stock for screw 89. Either of the screws 88 or 89 may then be threaded through the finger 81 and into the stock to hold arm 43 in inoperative, folded relationship.

A spirit level 100 of conventional construction is mounted in the end of the stock adjacent which the arc 68 (Figs. 5 and 8) extends to aid in determining the vertical disposition of the work incident to the placement of the stock thereagainst. A guide plate 101 (Fig. 2) is pivoted in a recess formed in the edge of the outer arm 47 adjacent the attachment of the latter to the lower end of arc 68 so as to swing outwardly from the arm and stock. A second guide plate 102, complementary in function to plate 101, is pivoted to the opposite end of the stock (see Fig. 2) on the end of pin 42. The plates 101 and 102 may be swung outwardly to assist in aligning arm 47 in parallel relationship with the work, the disposition of which is to be gauged by the spirit level 100, as depicted in Fig. 5 in which the work is designated by the numeral 103. It will be appreciated that the guides are also useful in aligning the arm in proper relationship with the work when the arm is extended from the stock.

A jointed T-square, comprising a blade 104 and back 105, is slidably mounted on the outer arm, the back being adapted to engage the outer edge of arm 47 with the blade 104 extending across the arm and stock (see Fig. 18). The base of the blade is enlarged and formed with a circular opening 106 having a center coinciding with the point of intersection of one edge of blade 104 and the inner edge of the outer arm 47. This relationship of the blade and arm is maintained by a circular, flanged bearing member 107, the hub of which projects into the opening 106 in the blade and is secured rigidly by three screws to an extension of the back 105 of the T-square which overlies the edge of the arm 47 beneath the bearing member 107 and base of blade 104. The flange of the bearing member overlies the adjoining annular portion of the blade 104 to prevent inadvertent separation of the blade and back while permitting the blade to be swung arcuately upon the hub of the bearing member so as to form any required angle between the blade and arm. A boss 108, integral with the back 105 of the square adjacent the base of blade 104, affords a mounting for a clamping screw 109. The head of screw 109 overhangs the base of blade 104 with which it is adapted to be frictionally engaged so as to fix the preadjusted angular relationship between the blade and outer arm. The extension of back 105 below the bearing member 107 is formed with a circular opening 110 axially disposed with the bore of member 107, into which opening a transparent plate 111 is mounted. A pair of cross hairs carried by plate 111 intersect at a point coinciding with the intersection of the inner edge of the outer arm 47 and a calibrated edge of blade 104 whereby the exact disposition of the blade upon the arm may be ascertained with facility.

The T-square is normally maintained in described relationship with the outer arm by a pair of clamps 112 (Figs. 1 and 19) which engage opposite ends of the back 105. One end of each clamp 112 is hooked under the adjacent inner edge of outer arm 47, and its opposite end extends downwardly across the outer edge of back 105 but in spaced relationship with respect to the latter. A thumb screw 113 is threaded through a hole in the last-named end of each clamp 112 so as to project into an aligned hole 114 formed in the opposed edge of back 105. It will be appreciated that by tightening the screw 113 against the bottom of hole 114 in the back of the square the latter may be frictionally locked in any preadjusted position along the length of the outer arm. In order to assure the maintenance of the clamps 112 in their respective positions forming right angles with the outer arm, the portions of the back 105 of the square over which the clamps 112 extend, are formed with elongated recesses 115 into which lugs 116, integral with the underside of each clamp, are adapted to be snugly received. The T-square assembly is thus removable when its use is not required so as to facilitate handling and storage of the composite instrument.

Integral with the casting of which the stock is composed are two circular housings 117 (Fig. 7), in each of which a dual spirit level assembly 118 is located. Each assembly comprises two arcuate glass tubes 119 having their ends mounted in plaster of Paris blocks 120 and containing a suitable liquid and air bubble. The pair of levels 118 of one assembly are arranged in spaced and adjacent relationship in opposition to one another so as to center the air bubble in one or the other tube when either longitudinal side of the stock is in a lower horizontal position. The tubes 119 of the other assembly 118 are rotated 90° with respect to the levels of the first assembly so as to indicate the vertical position of the sides of the stock, the respective tubes thereof being curved in opposite directions. The blocks 120 of each assembly carrying the ends of each tube are disposed within recesses formed in the circular wall of housing 117. The tubes are enclosed within the housing 117 by a transparent glass pane 121 countersunk in the housing with the marginal edge thereof suitably secured to the circular housing. At the opposite side of the stock the side plates 37 cover each dual level assembly 118, but countersunk into the housing 117 beneath the respective plates is a mirror 123 arranged to reflect light transmitted through the glass pane 121 into the tubes 119 to facilitate visual location of the bubbles.

Also mounted in the stock adjacent the respective spirit level assemblies 118 are a pair of rotary indicators 127 by which the angle of inclination and slope per foot of the surfaces upon which the level stock is placed, may be determined. The indicators are of identical construction, and accordingly the following detailed description of one thereof will suffice for an understanding of each. However, the indicators 127 are rotated 90° with respect to one another to indicate zero inclination with the lower longitudinal edge of the stock in horizontal and in vertical positions, respectively.

Each indicator 127 comprises a circular casing 128 supported within a housing formed within the casting of which the stock is composed, by a pair of screws 189 (Figs. 34 and, in dotted lines, 1) threaded through the stock. The inner ends of the screws are tapered to form a bearing surface disposed at a right angle to the radius of casing 128 passing through the point of contact of the respective screws, whereby the latter may be turned into frictional locking engagement with the casing. The casing is formed with an inwardly-directed flange 129 at its rearward end, and a pair of diametrically-opposed guide ribs 130 within its bore parallel to the axis of the casing. The back of casing 128 comprises a circular plate 131, the marginal edge of which bears against the flange 129. Diametrically-opposed grooves 132 in the periphery of plate 131 receive the guide ribs 130 which function to key the plate 131 and outer casing 128 together against relative rotative movement. The plate is formed with a plurality of openings 133 therein arranged circuitously about its axis to permit the flow of a clear heavy liquid with which the casing is filled, to opposites of the plate. Across the beacksurface of plate 131 is an annular corrugated diaphragm 134, preferably composed of copper, its edge being secured firmly by suitable means to the plate so as to retain the bulk of the liquid within the casing forward of the plate but to relieve, by its expansion and contraction, variations in pressure of the liquid within the casing which may be induced by changes in temperature. Fitted snugly within the bore of the casing 128 are a pair of annular lining members 135 and 136, similarly keyed by ribs 130 to the outer casing. Between the members 135 and 136 the marginal circular edge of a disk 137 is clamped. A glass plate 138 extends across the outer edge of the lining member 136 and is sealed with the bore of the casing by a gasket and ring nut assembly 139. Ribs 130 engage in complementary grooves 132 formed in the periphery of both disk 137 and plate 138 to hold the same against rotative movement. 140 indicates a series of holes formed in disk 137 for the unrestricted flow of the liquid throughout the casing.

Journalled axially in casing 128 is a shaft 141 upon which the hub of a needle 142 is mounted. One end of shaft 141 is conical for reception by a conical bearing 143 mounted axially in the back plate 131. The angle of the conical walls of bearing 143 is slightly greater than the angle of the complementary end of the shaft 141, whereby the shaft contacts the bearing only at its extreme tip. Shaft 141 projects through an opening in disk 137 and terminates in a pointed end journalled in a conical bearing 144 (Fig. 12) of wider angle, formed in the end of a screw 145. The screw is threaded into a flanged collar 146 clamped in an axial hole in the glass plate 138 by a nut 147. It will be noted that by rotating the screw 145 the bearings 143 and 144 may be critically adjusted to insure a minimum of friction upon shaft 141. A needle 142 mounted upon shaft 141 is accordingly free to rotate behind the dial in response to gravitation of a pendulum weight 149 suspended from shaft 141 intermediate the back plate 131 and disk 137. The pendulum 149 comprises a shank through the upper end of which shaft 141 extends, and an arcuate section 150 (Fig. 13) connected to the lower end of the shank for suspension in close proximity to the inner surface of the adjacent lining member 135. Each end of the weight section 150 is formed with an upstanding fin 151 disposed in a radial plane of casing 128. Fins 151 function to retard the swing of the pendulum in the liquid contents of the casing and minimize oscillation of the needle 142 when positioning the device relative to the work.

Needle 142 comprises a hub 152 having a pair of diametrically-opposed radially-projecting channels 153 (Fig. 17) composed of any suitable material. Intermediate the ends of each channel 153 the back of the channel is arcuately depressed (see Fig. 16) so as to form a light-collecting concavity 154, the bottom of which extends, at each end, beneath the bottom of the adjoining section of the channel, as indicated at 155 in Fig. 11. An index line is delineated in the middle of each channel 153, so as to coincide with a diameter of the casing and play across a dial marked on the inner surface of glass plate 138. The concave offset 154 of part of each channel 153 with respect to the plane of the back of the channel at the ends of the latter enables more accurate reading of the dial by obviating the parallax due to the necessary displacement of the needle 142 from the face of the dial. It will be apparent that the displacement of the reaches of the index line upon the outer flat surface of the channel and the concave, depressed surface thereof results in parallax which will be obvious to the user when the index line is viewed from a lateral oblique angle. If viewed from a point directly in front of the dial, as is necessary for accurate reading, the index line on the relatively offset surfaces of the needle appears to be unbroken and will be accurately aligned with the proper calibrations of the dial. The extension 155 of the concave portion 154 of each channel 153 beneath the flat portion thereof assures the appearance of an unbroken index line to the user viewing the device from directly above or below the indicator needle. The dial upon the inner face of plate 138 of each of the rotary slope indicators 127 comprises two scales 156 and 157, the former being graduated in degrees with which one end of the needle is adapted to register, and the latter is delineated at the diametrically opposite arc of the dial and is calibrated in rise per foot, whereby both the degree of inclination and the slope per foot of the work may be coincidentally determined.

In Fig. 14 I have illustrated a modified form of indicator assembly embodying mechanism for critically adjusting the disposition of the bearings for the needle shaft 141. The back plate 158 is formed with an opening in the upper arc thereof through which the casing 128 is filled with liquid, it being desirable to completely displace all air from the casing by the liquid so as to obviate the formation of bubbles which might otherwise interfere with the reading of the dial. The opening is normally sealed by a threaded plug 159.

The shank of a shaft bearing 160 projects through an axial opening 161 in the plate 158 which is countersunk to accommodate a retaining ring 162 snugly encircling the shank. A nut 163 threaded on the end of the bearing shank clamps the bearing 160 and ring 162 to plate 158 so as to prevent axial movement of the bearing. Lateral adjustment of the bearing is provided by four screws 164 threaded radially into the ring 162 with their heads bearing against the annular wall of the countersunk portion of opening 161. As the shank of shaft bearing 160 is diametrically smaller than opening 161 in plate 158 through which it extends, variations in the threaded adjustment of the screws 164, relative to one another, is effective to shift the bearing and the end of the shaft 141, rotatably supported thereby, laterally so as to assist in effecting absolute alignment of the index line marked on needle 142 with the zero calibration of the dial when the level is in a horizontal position.

The opposite conical end of shaft 141 is supported in a bearing 165 of the kind hereinabove described, which in this embodiment comprises a circular block supported in the center of the glass plate 138 by a series of screws 166 in a manner analogous to the supporting means for the rearward end of the shaft. An annular collar 167 having a rabbeted edge is fitted into a complementary axial opening in the glass plate 138, and is formed with a rim 168 which projects through the plate for threaded attachment of a cap 169. A gasket 170, interposed between cap 169 and plate 138, permits the formation of a liquid-tight seal between collar 167 and plate 138. The bore of rim 168 is threaded for reception of a liner 171 having an inwardly-directed annular flange 172. Integral with the bearing 165 is a stem 173 which projects through the bore of flange 172 and into liner 171. A sleeve 174, snugly fitted on stem 173, is clamped rigidly against the flange 172 of liner 171 by a nut 175 so as to obviate axial movement of the bearing 165 with respect to the liner. The bearing may be adjusted laterally by the screws 166 threaded radially into collar 167 in equi-spaced relationship with their heads contacting the bore of liner 171. By varying the threaded extension of screws 166 into sleeve 174 relative to one another, the stem 173 and bearing 165 may be variably supported to assure perfect alignment of the adjacent end of the shaft with the axis of the casing assembly. It will be observed that by rotation of liner 171 the bearing 165 may be shifted axially relative to bearing 160. A hole 176 formed in collar 167 permits the flow of the liquid contents of the casing around the bearing and allows the air to escape.

To further assist in effecting the proper alignment of needle 142, a set screw 177 is threaded through the upper end of pendulum 149 to engage shaft 141 and thereby lock these elements in preadjusted proper position.

Needle 142 of the embodiment of Fig. 14 is provided with a hub 178 having a bore somewhat larger than shaft 141 to permit sufficient play for its critical lateral adjustment upon the shaft, as about to be explained. An annular coaxial groove 179 is formed in hub 178 to accommodate the heads of four screws 180 threaded through the circular wall between the groove 179 and bore of hub 178 so as to abut against the shaft and variably support the needle in proper relationship with the dial for most accurate reading. The relationship between the needle and shaft is reinforced by a disk 181 integral with shaft 141 and disposed in an axial opening in the disk 137. A series of holes 182 equi-spaced around the marginal edge of disk 181 are adapted to receive diametrically-smaller threaded pins 183 projecting rearwardly from hub 178 of the needle 142. Nuts 184 threaded on each pin 183 are effective to clamp the hub and needle in a plane perpendicular to the axis of shaft 141, or variously as specific adjustments are desired.

In Figs. 38 and 39 I have illustrated a modified form of rotary indicator wherein the needle 142 is maintained in a normal position by the action of both a pendulum weight and a float or buoy. The pendulum 149 is of substantially the same construction as hereinabove described. The upper end of the shank of the pendulum is fitted snugly to shaft 141 intermediate the disk 137 and back plate 133. The casing assembly is provided with liner 135, and, being otherwise identical with the construction hereinabove referred to, is not further described. The weight 149 is equipped with fins 151 to resist movement through the liquid with which the case is filled so as to dampen oscillation of needle 142. Connected integrally with the upper end of the shank of weight 149 is a float 190 comprising a sealed chamber, the upper wall of which conforms in contour and extends in close proximity to the inner surface of the liner 135. The bottom of float 190 is connected to the arcuate section 150 of the pendulum 149 by a pair of strips 191 which correspondingly follow the contour of the lower arc of the inner surface of liner 135 to assure greater rigidity in the needle-actuating assembly.

An important feature of the embodiment of Figs. 38 and 39 resides in the combination of a float and weight, structurally opposed but functionally supplementary to one another, wherein the buoyancy of float 190 is substantially equal to the weight of the assembly, i. e., to the weight of the float 190, pendulum 149, shaft 141 and needle 142, so as to minimize and in fact substantially eliminate friction upon bearings 143 and 144, which, accordingly, serve merely, in this embodiment, primarily as guides.

The edge of stock 35 adjacent the recess 41 in which the pivoted arms 43 and 47 are received, when in folded position, is straight and is graduated in suitable units of measurement, e. g., inches, from the point of pivoting of the arms to its opposite end. Correspondingly, the respective, intermediate and outer arms are calibrated in suitable units of measurement. In a like manner blade 104 of the T-square is graduated from the point of intersection of the edge thereof with the outer arm 47 toward its upper end. The inner edge of the arc 68 bears a scale 185 calibrated in degrees from the intersection of the arc and inner edge of the outer arm 47 to indicate the degree of any angle formed between the outer arm and stock, and enable the calculation of the angle formed between the intermediate arm 43 and stock 35, as well as between the arms 43 and 47 themselves. For many purposes it is desirable that the slope of the stock and either or both of the arms relative to one another may be ascertained in terms of slope or rise per foot. Accordingly, the outer edge of arc 68 bears a scale 186 calibrated in thirty-seconds of an inch rise in twelve inches, the degree marks of scale 185 and the calibrations of the scale 186 coinciding for any adjustment of the outer arm and readable from the vernier 77 and index plate 78, respectively.

It will thus be seen that the dimension of the sides of any triangle formed between stock 35, T-square blade 104 and either of the arms 43 or 47 is at once indicated or easily calculated. Moreover, with the blade of the T-square forming a right angle with the outer arm and the angle between the outer arm and stock indicated on the arc 68, the degree of the angle formed between blade 104 and stock 35 may be easily determined, as will be obvious, by merely subtracting the degree of the angle between the outer arm and stock from 90°. A protractor (not shown) may be associated with the intersection of the blade 104 and back 105 of the T-square to facilitate exact adjustment of the T-square with respect to the outer arm, as occasion requires.

In order to facilitate the proper alignment of the stock with the work when the outer arm 47 is extended, I provide two pairs of laterally extensible guides 187 and 188 (Fig. 2) pivoted in elongated recesses formed in the edge of the stock adjacent opposite ends, respectively, of the latter so as to be flush with the surface of the stock. One pair of guides 187 are arranged so as to swing in the plane of movement of the arms 43 and 47. The second pair of guides 188, similarly located at opposite ends of the stock, are pivoted on pins disposed at right angles to the pivots of the first pair of guides 187, whereby guides 188 are adapted to be swung outwardly in a direction parallel to the plane of the bottom of the stock to bear against the face of a work member contiguous with the rear surface of the level.

While the applications and utilities of the assembly are very numerous, the following example, particularly pertinent to roof structures, will be illustrative. Given a run of twelve feet for an existing roof, the user may with facility find the slope and rise as well as the angles of the heel and plumb cut of the rafters. The T-square is set on a 12' calibration of the outer arm 47 to delineate the run of the roof. The outer arm is then placed upon the roof so as to assume the slope, and the stock 35 is elevated to a horizontal position by swinging it upwardly on the arc 68. This position of the stock will be determined by the levels 118 or rotary indicators 127. The angle thus formed between the stock and outer arm is fixed by manual actuation of the friction-locking screw 79. The proportionate length of the rafter will thereupon be shown upon stock 35 and the rise is read on the T-square blade 104. Coincidentally, the angle formed between the outer arm 47 and stock, the degree of which is indicated on scale 185 of the arc 68, is that of the heel cut, while the angle of the plumb cut is formed between the blade 104 and stock. To mark a board to be used as a common rafter in such a roof, i. e., for replacing or supplementing the rafters of existing roofs, the guides 187 and 188 are swung outwardly from the stock and placed against adjoining sides of the board to support the bottom of the stock in parallel relation to the surface of the board on which the cut is to be marked, whereupon the user may accurately mark the heel cut along the outer arm. At the opposite end of the board, in a similar manner, the plumb cut will be delineated for marking the board along the blade of the T-square, the relation of the stock and board being the same.

The side cut of a jack rafter for such a construction may thereafter be obtained by first loosening the arc and extending the outer arm to intersect the slope dimension theretofore obtained, on the T-square with the straight edge of the stock. The side cut of the jack rafter will be delineated between the blade and stock, and may be marked on the board to be cut in a manner above described. The degree of the angle of the side cut may be determined as hereinabove indicated by subtracting the degree of the angle formed between the stock and outer arm, indicated on the arc, from 90°, as will be obvious.

An example of the utility of the intermediate arm 43 and associated apparatus is as follows: A horizontal distance from one point to an inaccessible point as, for instance, a point beneath the surface of the earth, may be obtained by plumbing a rod (not shown) above the point to be located and measuring by means of a transit an interval upon the rod. The level 100 aids to properly position the rod during this preliminary operation. The slope per foot of the line of sight from the transit to the lower point upon the rod is then noted, and correspondingly the slope per foot of the line of sight to the point at the upper end of the rod interval is noted. The outer arm 47 and the stock are spread apart by pivoting on pin 42 until the lesser slope per foot obtained from the transit is indicated on the arc 68. The intermediate arm 43 and arc 68 are then locked together by the thumb screw 84, and the angle between the stock and outer arm is increased until the slope per foot of the stock, indicated on the arc, corresponds to the greater slope obtained from the use of the transit. The stock and arms 43 and 47 are then locked together by the actuation of the screws 79 or 89, or both, thereof. Thereafter the T-square is shifted along the outer arm until the distance along its calibrated edge between the intermediate arm 43 and stock equals the length of the rod interval. The horizontal distance sought will be that indicated at the intersection of the T-square blade 104 and outer arm 47. It will be understood of course that measurements laid out upon the elements of the apparatus are to scale and, by scaling, the reading on the outer arm indicates the horizontal distance sought to be ascertained.

Another example of the use of the apparatus which is indicative of the scope of its utility is as follows: It is sometimes necessary to determine the exact horizontal distance between two points, one of which is not accessible because of intervening obstacles such as a river or the like. With the aid of a transit a line is sighted between the points. At right angles to this line a third point is set, and the distance between the transit and the third point is then measured. A line is then established with the aid of the transit between the third point to the non-accessible original point, and the angle between this line and the line established between the points of successive location of the transit is noted.

The level is then arranged with the outer arm 47 in a horizontal plane. The stock is tilted upwardly until the rotary indicator 127 (at the right end of the stock) registers the angle obtained above by the aid of the transit. Coincidentally, the other rotary indicator 127 will register in degrees the difference between the angle previously measured and 90° as a check upon the accuracy of the preadjustment of the assembly. The T-square is then moved along the outer arm until the unit of measurement on its edge scaled to the distance between the original and established points in the field intersects with the straight calibrated edge of the stock. The distance indicated on the outer arm 47 at the point of intersection between the blade 104 of the square will be the scaled distance sought between the original points.

While I have shown and described but a single embodiment of my invention with but one alternative form of rotary indicator, it will be understood that numerous changes in size, design, shape and number of the various parts may be made, and that the various elements of the level may be calibrated in accordance with either the domestic, metric or any other well-known standards of measurement desired, and may be subdivided as required, without departing from the spirit of my invention as defined by the appended claims.

What I claim and desire to secure by Letters Patent is:

1. In a device of the character disclosed, a body having a calibrated straight edge, a calibrated arm having one end pivoted to one end of the said body, a second calibrated arm extending between the first arm and body and pivoted to said body at the point of pivoting of said first arm, both of said arms having straight edges converging on the point of pivoting of said arms with the body, said second arm being movable independently of said body and said first arm to proportion the angle formed between the latter, an arcuate member secured to the end of said first arm opposite the pivot for said arm and extending slidably through said body, the arc of said arcuate member having a center on the point of pivoting of said first arm and the body, and bearing, side by said, scales of degrees and slope per unit of measurement of one side of the angle formed between said first arm and said body, the slope scale being coordinated with the calibrations of said first arm and straight edge of the body whereby the length of the sides and degree of any angle formed between the body and the first arm and the slope of the first arm per unit of measurement of the straight edge of the body relative to a horizontal plane is indicated, and a rotary indicator carried by said body operable to indicate the degree of slope of the straight edge of the body relative to a predetermined plane.

2. The device as set forth in claim 1, characterized in that the second named arm is provided with a guide at the outer end thereof in engagement with the arcuate arm carried by the first arm, means to lock said arm to said arcuate member at any point thereon, a finger carried by the second arm and an elongated slotted retainer releasably secured to said finger, the said elongated slotted retainer overlying the said body, and means between the said body and said elongated slotted retainer for locking said slotted retainer against movement.

3. The device as set forth in claim 1, characterized in that a calibrated T-square comprising a bar and a back member is provided, the said back member being slidable on the first named arm, the said bar overlying the straight edge of said body and the first and second arms.

4. The device as set forth in claim 1, characterized in that a level is carried by the body and operable to indicate a horizontal position of said straight edge of the body.

EZRA LEO CALLAHAN.

References Cited in the file of this patent

UNITED STATES PATENTS

| Number | Name | Date |
|---|---|---|
| 426,696 | Washburn | Apr. 29, 1890 |
| 505,937 | Brown | Oct. 3, 1893 |
| 662,977 | Schmelz | Dec. 4, 1900 |
| 740,491 | Tilley | Oct. 6, 1903 |
| 776,277 | Volberding | Nov. 29, 1904 |
| 839,662 | Smith | Dec. 25, 1906 |
| 875,243 | Cramer | Dec. 31, 1907 |
| 905,054 | Chynoweth | Nov. 24, 1908 |
| 977,735 | Hansen | Dec. 6, 1910 |
| 1,014,402 | Larsen | Jan. 9, 1912 |
| 1,024,863 | Myers | Apr. 30, 1912 |
| 1,043,605 | Kendrick | Nov. 5, 1912 |
| 1,145,719 | Tucker | July 6, 1915 |
| 1,215,711 | Rounds | Feb. 13, 1917 |
| 1,409,342 | Henricks | Mar. 14, 1922 |
| 1,640,020 | Abrahamson | Aug. 23, 1927 |
| 1,855,394 | Hill | Apr. 26, 1932 |
| 1,855,664 | Budge | Apr. 26, 1932 |
| 2,068,128 | Galford | Jan. 19, 1937 |
| 2,097,848 | Torbert | Nov. 2, 1937 |
| 2,160,049 | Willson | May 30, 1939 |
| 2,211,201 | Fell | Aug. 13, 1940 |
| 2,220,029 | Stephan | Oct. 29, 1940 |
| 2,332,347 | Shafer et al. | Oct. 19, 1943 |
| 2,370,753 | Reece | Mar. 6, 1945 |

FOREIGN PATENTS

| Number | Country | Date |
|---|---|---|
| 527,754 | Germany | June 20, 1931 |